Dec. 25, 1923.  1,478,890

L. J. J. B. CHÊNEAU

HAULAGE AND LIKE SYSTEM AND APPARATUS

Filed Feb. 3, 1921   10 Sheets-Sheet 1

*Fig. 1.*

Inventor
Louis J. J. B. Chêneau
By
Attorney

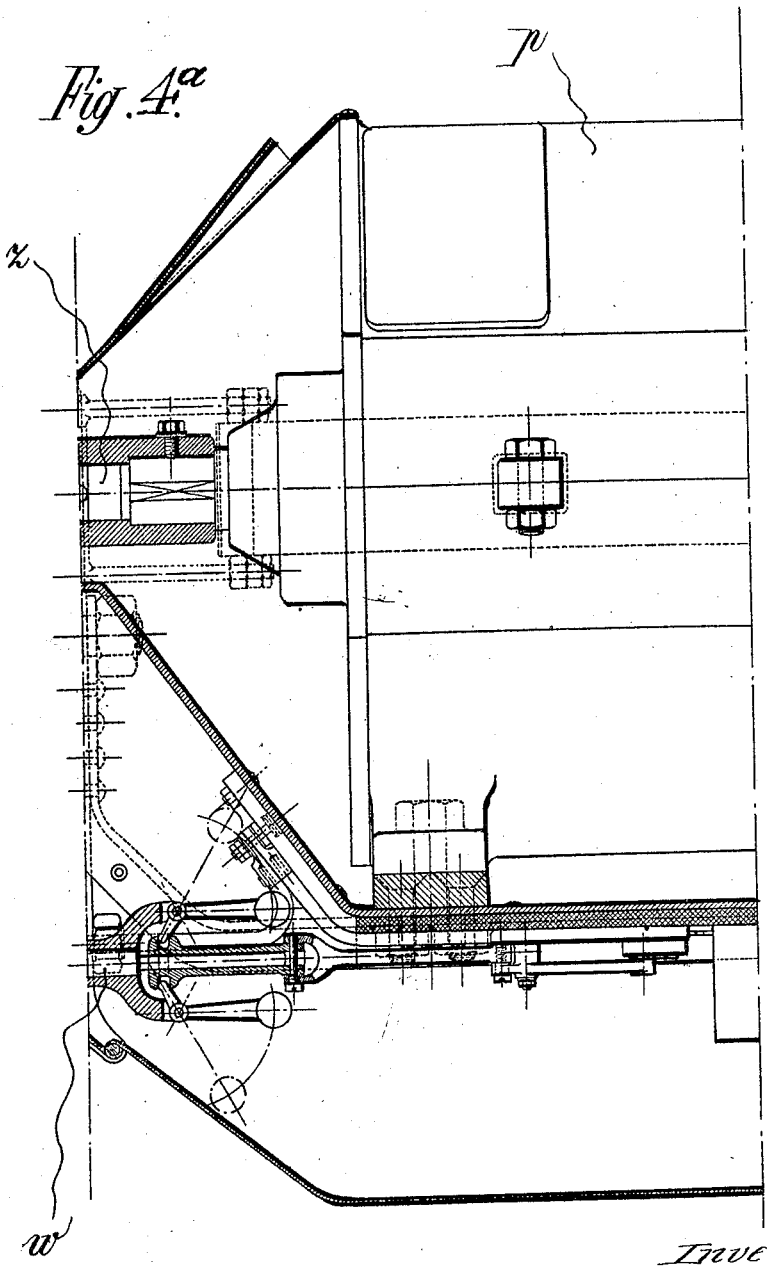

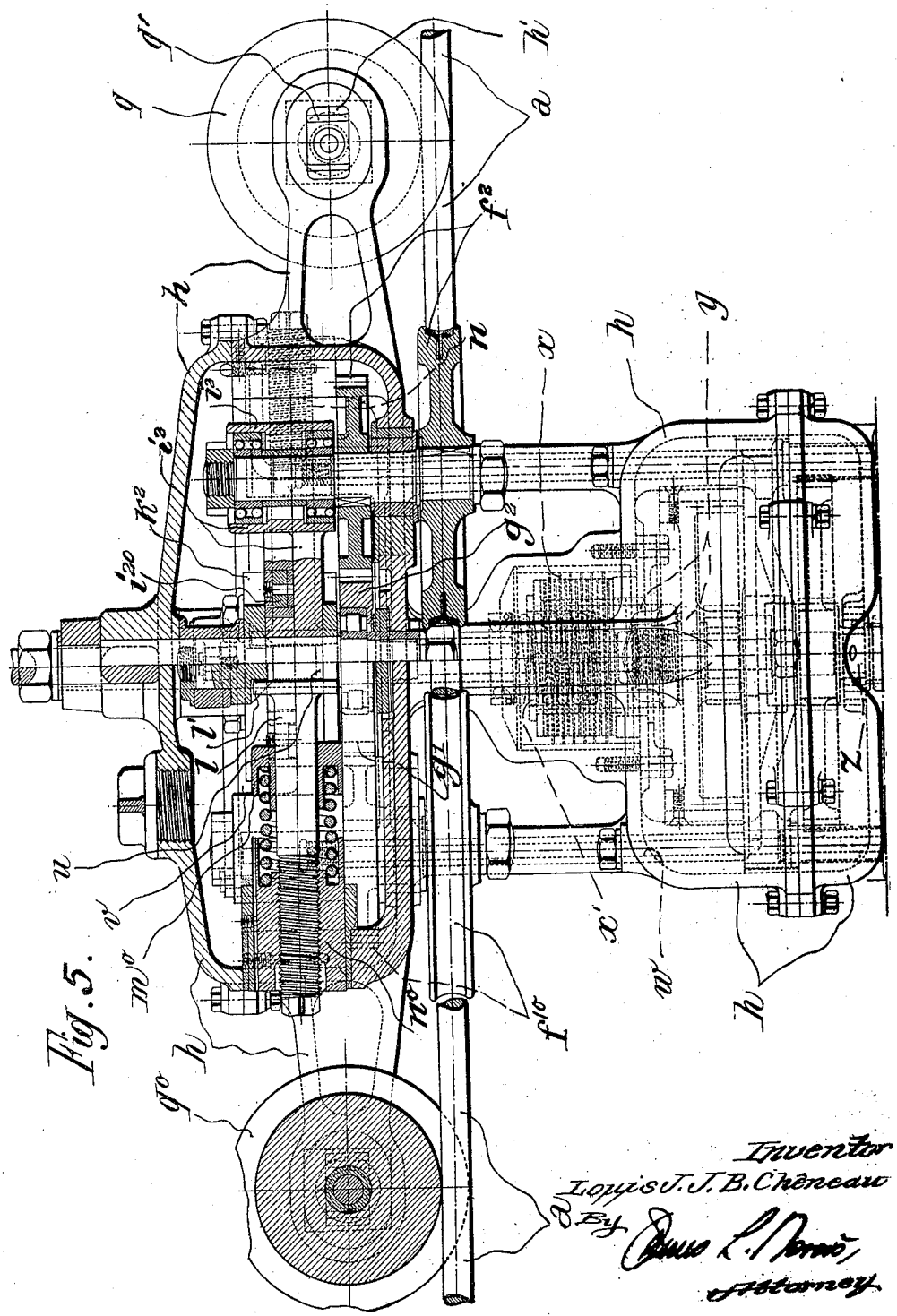

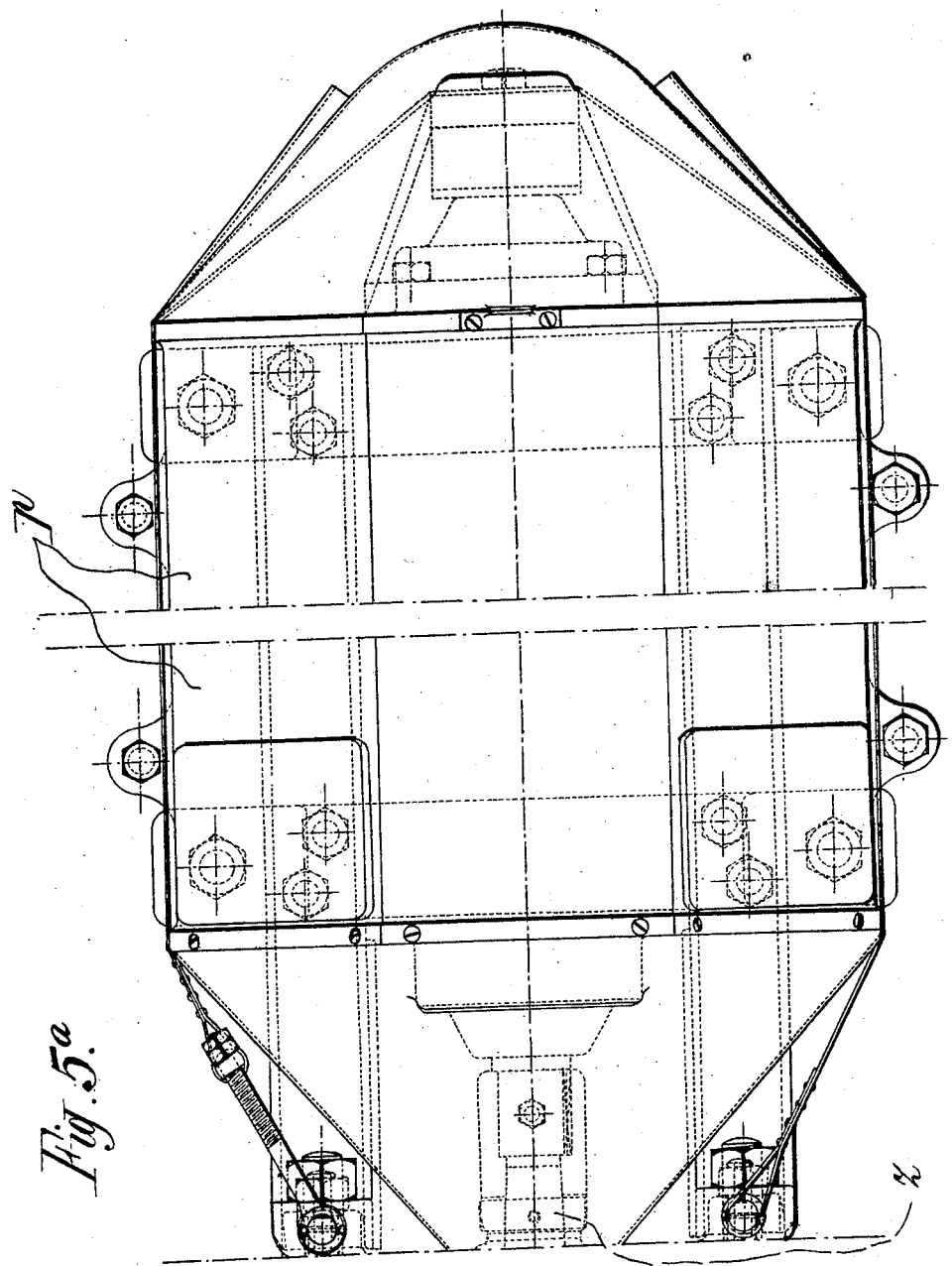

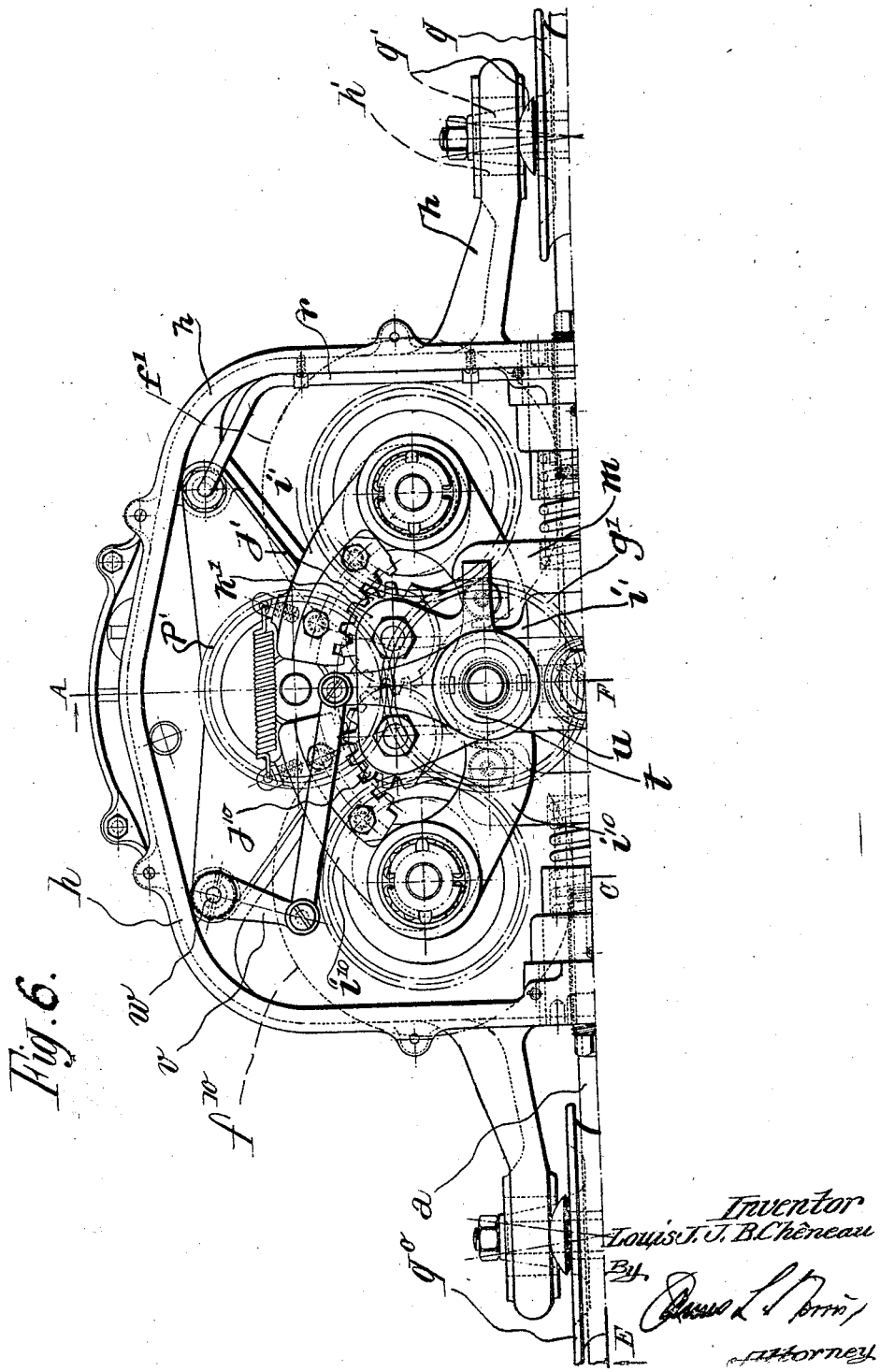

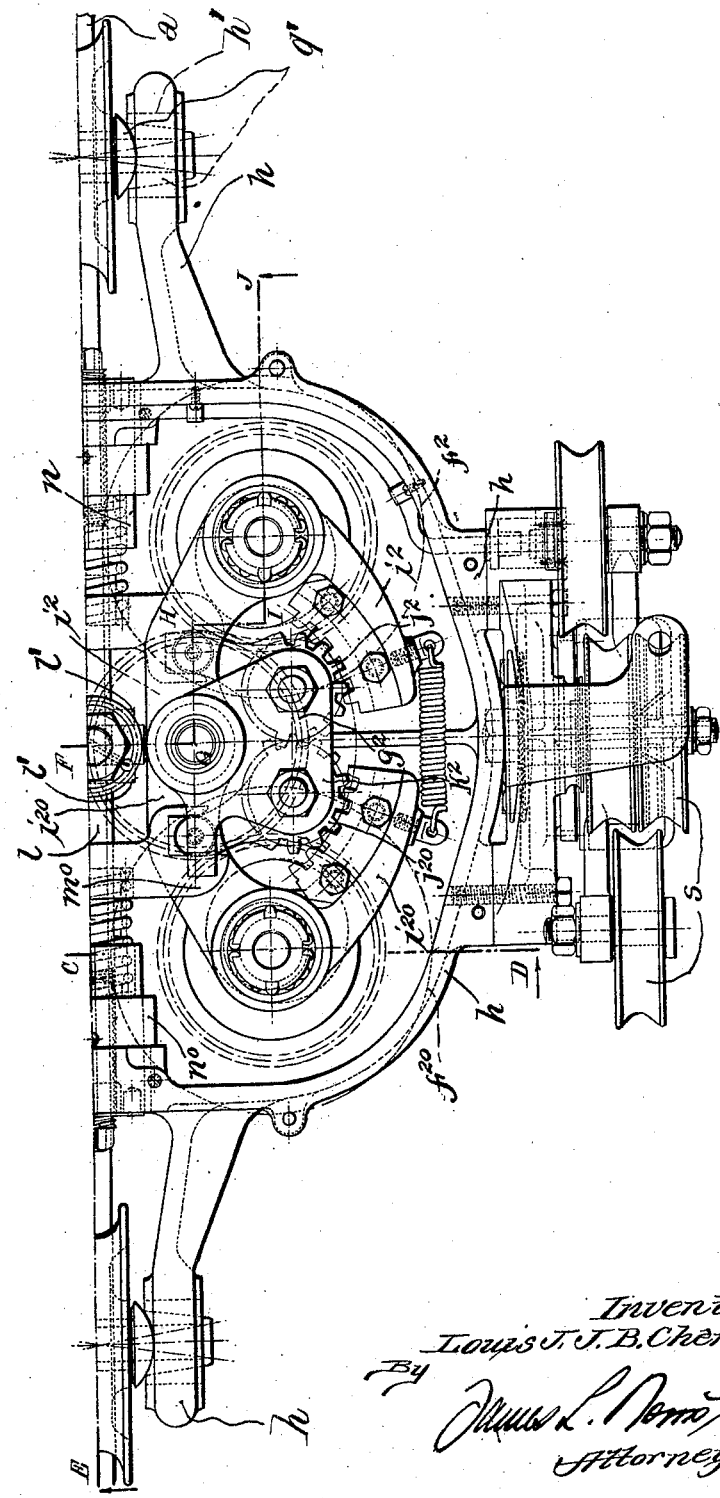

Dec. 25, 1923.    1,478,890
L. J. J. B. CHENEAU
HAULAGE AND LIKE SYSTEM AND APPARATUS
Filed Feb. 3, 1921    10 Sheets-Sheet 10

Inventor
Louis Joseph Jean Baptiste Cheneau
By
Attorney

Patented Dec. 25, 1923.

1,478,890

UNITED STATES PATENT OFFICE.

LOUIS JOSEPH JEAN BAPTISTE CHÊNEAU, OF PARIS, FRANCE.

HAULAGE AND LIKE SYSTEM AND APPARATUS.

Application filed February 3, 1921. Serial No. 442,198.

*To all whom it may concern:*

Be it known that I, LOUIS JOSEPH JEAN BAPTISTE CHÊNEAU, a citizen of the French Republic, residing at Paris, Seine, France, have invented certain new and useful Improvements in Haulage and like Systems and Apparatus; and I do hereby declare the following to be a full, clear, and exact description of the invention, such as will enable others skilled in the art to which it appertains to make and use the same.

This invention relates to systems and apparatus of the type comprising a plurality of rotary members wherein a relative movement between all of such members and a part gripped thereby is produced, and relates more particularly to apparatus of the character just mentioned which are primarily adapted for use as tractors upon aerial cables for haulage purposes, wherein it is particularly useful, although it is not limited thereto.

The general object of the invention is so to construct systems and apparatus of the character just mentioned that they may function more satisfactorily than has hitherto been the case.

According to the invention the gripping members are mounted on pivotal arms provided with toothed sectors which mesh with pinion wheels having arms or the like engaging a movable member operated by means connected to the haulage rope or cable, the toothed sectors and pinions being so arranged and inter-connected that the gripping rollers exert an equalized pressure or effort on the member gripped, irrespective of the irregularities of thickness of the latter.

The invention also includes various constructional embodiments and arrangements which are preferably used in connection with the principal system or apparatus, and which will be more fully described hereafter.

In order that the invention may be clearly understood, I will now proceed to describe the same with reference to the accompanying drawings, but it is to be understood that the description and drawings are merely to be regarded as examples of carrying out the said invention.

Fig. 1 of the said drawing is a diagrammatic elevation of a portion of a haulage system comprising an electric tractor running upon an aerial cable, the whole system, and particularly the tractor, being constructed and arranged according to the invention.

Figure 2:
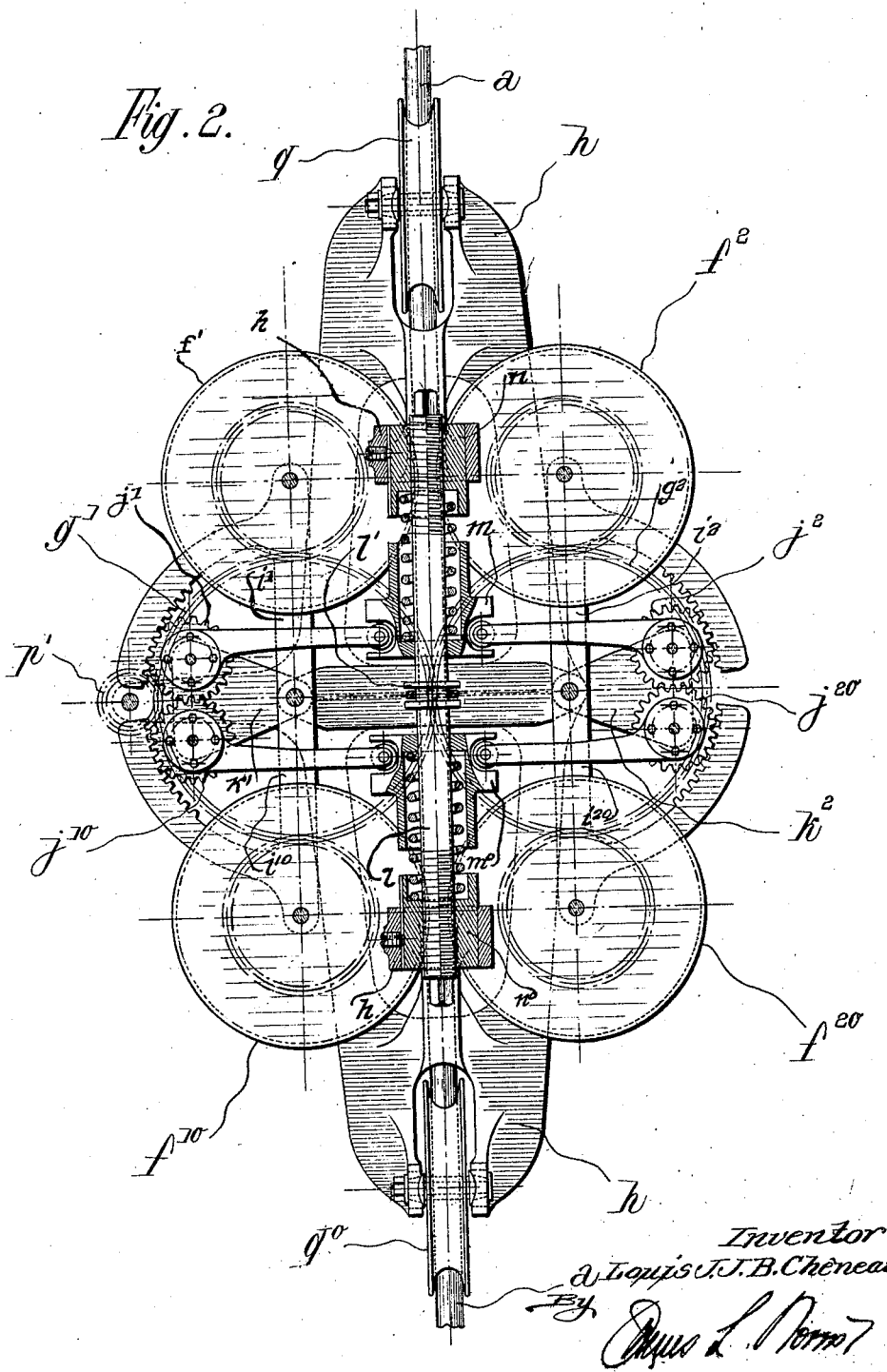
Figure 3:
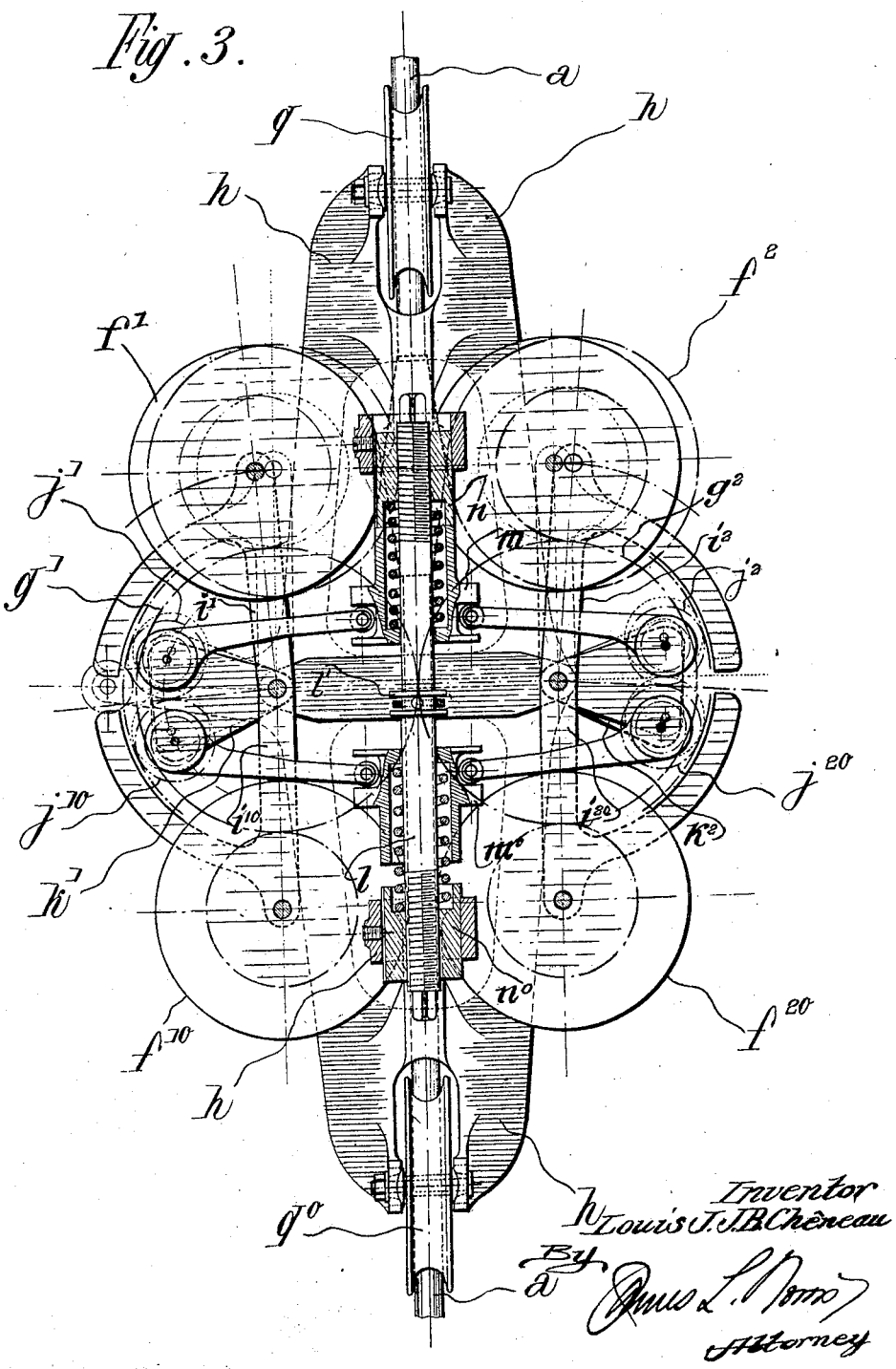

Figs. 2 and 3 are both diagrammatic part plan views of the aforesaid tractor, the parts of the tractor being shown in the positions they would occupy when the tractor is at rest, and in the positions which they would occupy when it is in motion and an extra thick part of the cable carrying it is encountered.

Figure 4:
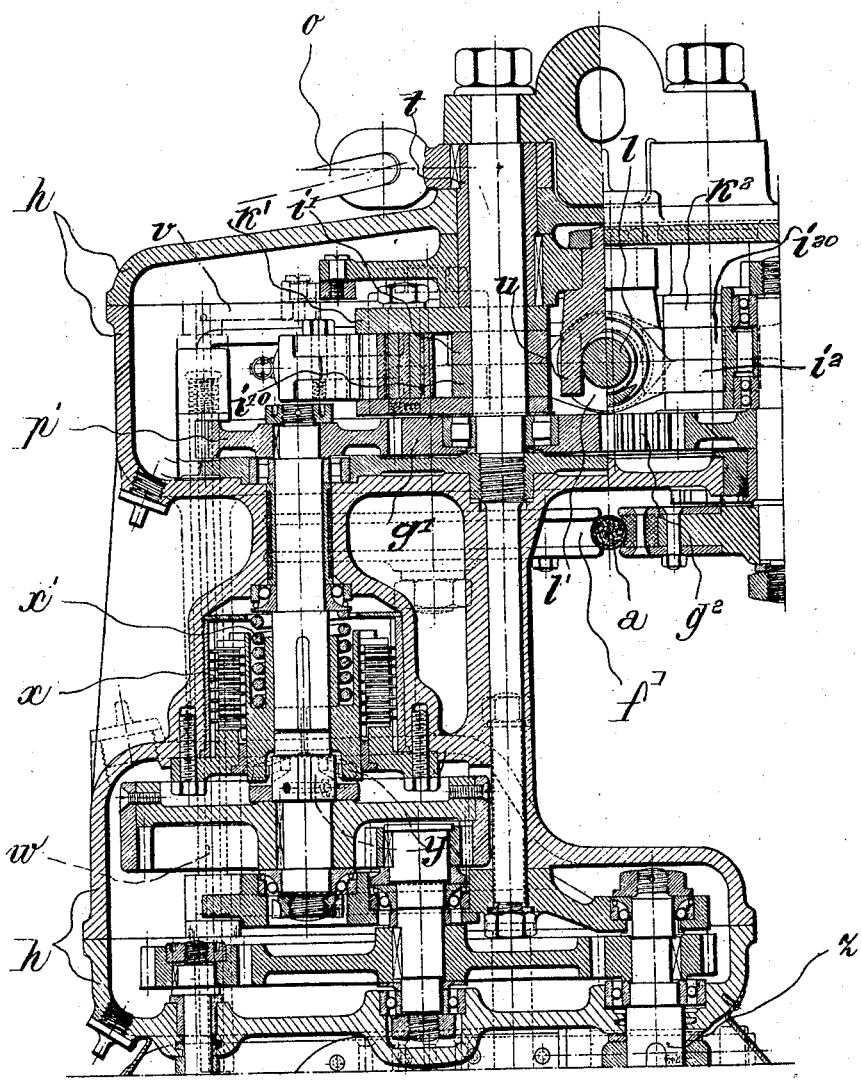

Figs. 4 and 4$^a$ show, respectively, in part, the upper and lower portions of the tractor, in vertical section taken on the line A—F, Fig. 6, and the line C—D, Fig. 6$^a$.

Figs. 5 and 5$^a$ illustrate the tractor in a similar manner but in vertical section on the line E—F—G—H—I—J of Fig. 6$^a$.

Figure 7:
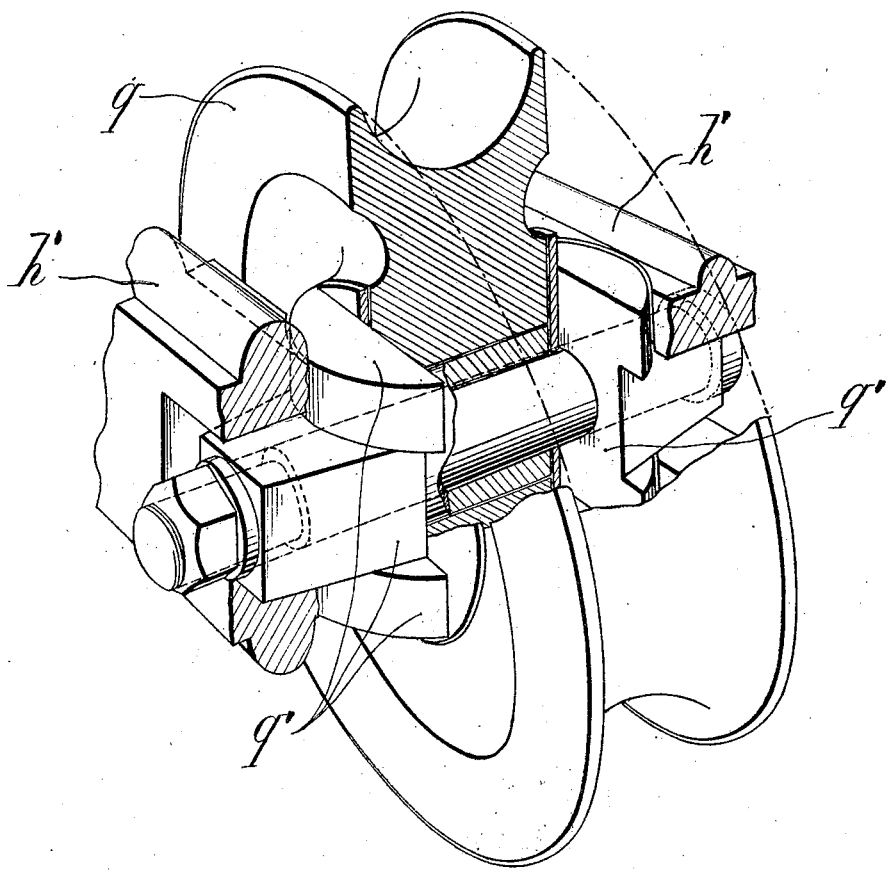

Figs. 6 and 6$^a$ illustrate said tractor in plan view with the upper casing of the framework removed, and Fig. 7 is a perspective view, partly in section, of the mounting for one of the tractor supporting wheels.

In the drawings, which as previously stated, illustrate the method of applying the system and apparatus to a haulage installation comprising an electric tractor running upon an aerial cable $a$ is a cable of suitable construction and section, serving as the haulage cable and at the same time as a conductor for the return of the electric current.

$b$ is a second cable of any suitable construction and section serving as a conductor for supplying the electric current and carrying the trolley for picking up the current, such trolley being denoted by $c$.

$d$ are standards for the support of the cables $a$ and $b$, the second cable $b$ being carried above the first cable $a$.

Means are provided for suitably stretching the said cables and for holding them.

The means for carrying the cable may be of various descriptions. As indicated at $e$ they consist of attachment devices, adapted to be mounted on the standards $d$ in such a way as to oscillate or turn on the latter to suit the requirements of the cable. Means not shown on the drawing are added for anchoring the two extremities of each of the cables, and when this has been effected the cables are of constant length but variable tension.

Or the supporting means may be of a character suitable for the reception of the cables in such manner that the latter can slide, the supporting means being again attached to the standards $d$. In this case anchoring means may be provided for attaching one of the extremities of the cable thereto, and stretching means, such for example as a weight, may be provided for the other extremity, so that a suitable pull may be given from this extremity.

In other instances both extremities may be provided with stretching means, such as a weight.

In these instances when the installation has been set up the cables are at constant tension but vary in length.

The tractor proper is preferably constructed substantially as follows:—

$f^1$, $f^2$, $f^{10}$ and $f^{20}$ are four identical pulleys, each of which is provided with a toothed ring.

$g^1$ and $g^2$ are two toothed wheels engaging these toothed rings $h$ is the framework upon which the toothed wheels $g^1$ and $g^2$ are mounted so that they mesh with one another.

$i^1$, $i^2$, $i^{10}$ and $i^{20}$ are four arms of which $i^1$ and $i^{10}$ are mounted loosely at one extremity on the axle of the toothed wheel $g^1$ and $i^2$ and $i^{20}$ are mounted loosely on the axle of the toothed wheel $g^2$.

The four pulleys $f^1$, $f^2$, $f^{10}$ and $f^{20}$ are suitably pivoted on the arms $i^1$, $i^2$, $i^{10}$ and $i^{20}$ at the extremities of the latter so that the pulleys $f^1$ and $f^{10}$ engage with the toothed wheel $g^1$ and the pulleys $f^2$ and $f^{20}$ engage with the toothed wheel $g^2$.

Each of the arms $i^1$, $i^2$, $i^{10}$ and $i^{20}$ is provided with a toothed sector so constructed that, when the arms are pivoted in position the first and the third sectors are co-axial with the toothed wheel $g^1$, the two others being co-axial with the toothed wheel $g^2$.

$j^1$, $j^2$, $j^{10}$ and $j^{20}$ are pinions meshing with the toothed sectors just mentioned.

Each of these pinions is furnished with a tail.

$k^1$ and $k^2$ are triangular plates of which $k^1$ is pivotally mounted upon the axle of the toothed wheel $g^1$ and $k^2$ is mounted on the axle of the toothed wheel $g^2$.

The pinions $j^1$, $j^2$, $j^{10}$ and $j^{20}$ are pivoted at the other angles of these triangular plates, the arrangement being such that the pinions $j^1$ and $j^{10}$ mesh with one another and with the sector in connection with the arm $i^1$ and that in connection with the arm $i^{10}$; whilst the pinions $j^2$ and $j^{20}$ mesh with one another and with a sector of the arm $i^2$ and that of the arm $i^{20}$ respectively.

$l$ is a rod having a channelled collar $l^1$ at the middle and a squared portion at each end. $m$ and $m^0$ are hollow sleeves working loosely on the rod. $n$ and $n^0$ are nuts with oppositely directed threads screwing upon corresponding screw threads at the extremities of the rod, springs being interposed between the sleeves and the nuts. The rod is mounted in the framework $h$ by means of the said nuts so that it can slide longitudinally and can be rotated about its axis. The sleeve $m$ operates the two first mentioned tails, and the sleeve $m^0$ operates the other two tails. The nuts are adapted to slide relatively to the framework $h$ but cannot rotate. The springs tend to keep the rod, the tails and the four pulleys above mentioned in the mid position.

The haulage line $o$ is attached directly or indirectly to the collar $l^1$.

$p$ is an electric motor of any suitable construction mounted upon the framework $h$, and $p^1$ is a pinion operated by the motor and operating one of the toothed wheels $g^1$ or $g^2$.

$q$ and $q^0$ are two pulleys rotatably mounted on the framework $h$ in such a way that, when the parts are in position, the tractor is suspended in the desired manner on the cable $a$, these pulleys engaging thereon and rotating about axes vertical thereto.

Means are provided for supplying the motor $p$ with current. In the present instance this is shown as a conductor $r$ connected at one end to the trolley $c$ and at the other end to the terminal of the motor. This conductor may be passed over a tensioning device $s$ for keeping it under a suitable tension.

Devices are also provided for controlling the motor $p$. In some cases this control may be effected by means of the devices or arrangements forming the subject of a patent specification in the name of Couvreux filed in Belgium on 14th May, 1919. In this case the control is obtained from the boat or the like which is being towed by modifying the state of tension of the line itself. The control is preferably effected by sliding the rod $l$, suitable devices being interposed between the motor and the rod for effecting the required purposes.

The construction may advantageously be such as illustrated in Figs. 4, 5 and 6 where $t$ is a shaft rotatably mounted in the framework $h$, with its axis parallel to those of the toothed wheels and having keyed to its upper end means of attachment for the extremity of the line $o$. It is also associated with a two armed lever, one of the arms carrying a fork $u$ co-operating with the collar $l^1$ whilst the other arm is connected by linkwork $v$ with an axle $w$ from the extremity of which the control of the motor is effected.

In the construction just described it is only necessary to mount the tractor on the cable $a$, to make the appropriate electrical connections and to attach the line $o$ to a boat or the like to be towed by the tractor, when the system functions in the following manner.

When the line $o$ is not under tension, the various parts of the tractor are in the position shown at Figs. 2 and 4, the pulleys grip the cable $a$ under the action of the springs interposed between the nuts and the sleeves carried by the rod $l$. This action can be increased or diminished by turning the rod $l$ about its own axis, by operating one of the squared ends thereof by means of a suitable tool. Now suppose a pull is exerted upon the line $o$, for instance by means of a winch or capstan carried on the boat, the following results are obtained either simultaneously or consecutively, but in the latter case, with a very short interval between them.

1. There is a displacement of the rod $l$ from the position indicated in Fig. 2, to that indicated in Fig. 3. The result is in the first place that the corresponding spring is compressed by the nut $n$ and the sleeve $m$ acts upon the tails of the pinions $j^1$ and $j^2$ and through the intervention of these on the others $j^{10}$ and $j^{20}$ so that the four pulleys $f^1$, $f^2$, $f^{10}$ and $f^{20}$ are caused to grip the cable more tightly.

Then, when the nut $n$ has compressed the corresponding spring sufficiently there is a direct action on the sleeve $m$ thus directly augmenting the effect of the gripping action upon the cable $a$.

2. There is an angular displacement of the operating rod $v$ which starts the motor.

In this way the tractor is set in motion, and nothing in particular happens so long as the pulleys do not come into contact with a portion of the cable $a$ of a different thickness.

When however, as illustrated in Fig. 3, the two leading pulleys $f^1$ and $f^2$ come into contact with an exceptionally thick portion of the cable $a$, this portion is negotiated without any difficulty.

The pulleys $f^1$ and $f^2$ separate, moving with them the arms $i^1$ and $i^2$ upon which they are pivotally mounted. The toothed sectors connected to these arms, tend to turn the pinions $j^1$ and $j^2$ upon their axes. This turning motion is prevented by the retaining action exerted from the tails co-operating with the sleeves $m$ and they simply move back, the tails oscillating about their extremities. Through the intervention of their axles mounted thereon they operate the triangular plates $k^1$ and $k^2$ which latter are thus caused to be displaced angularly backwards around the axles of the toothed wheels. This is possible although the arms $i^{10}$ and $i^{20}$ cannot oscillate in the same direction since the pulleys $f^{10}$ and $f^{20}$ are prevented by the cable $a$ from approaching nearer to one another, owing to the fact that the pinions $j^{10}$ and $j^{20}$ can move along the sectors carried by the arms $i^{10}$ and $i^{20}$ at the same time moving the sleeve $m^0$ backwards by means of their tails thus increasing the compression of the corresponding spring which is only partially stressed.

A tractor constructed as shown in Figs. 4 to 6 gives particularly good results, and may be reversed if necessary.

In some cases it is desirable in addition to the arrangements just described or to those analogous to them, to adopt supplementary arrangements which are now about to be described, and which may, moreover, be used independently of those already described without departing from the general scope of the invention.

Means may be added for controlling the pulleys, which means comprises a brake adapted to lock the pulleys when the apparatus is stopped and to be put automatically out of action when the apparatus is put in motion. This is desirable in the case of tractors mounted on a cable, for preventing them running down slopes in the supporting cable when not desired.

In the case of the apparatus already described, the arrangements may be such as those indicated in Fig. 4. The brake proper comprises plates $x$, constituting a plate or disc clutch, of which the movable part is mounted on the axle of the pinion $p^1$ and is under the action of a strong spring $x^1$ tending to keep it in the operative position. $y$ is a helicoidal controlling or operating device controlled by the motor. This may be actuated from the shaft $z$ of the said motor through a train of gearing. The axle of the pinion $p^1$ is divided in the neighbourhood of the helicoidal device. When the motor is in action or starts it pushes the movable member so as to put it out of action as long as the motor remains in motion, but when the motor stops, the movable part drops down, this forming the clutch and locking the gear wheel, and consequently the gripping pulley, against motion.

The rollers $q$ and $q^0$ may be so mounted that each of them can be displaced angularly for a certain distance around a vertical axis passing through its centre, so that where the cable $a$ which supports the tractor curves round, the curve can be more easily negotiated.

This may be effected as shown by way of example in Figs. 6, 6ª and 7. The roller $q$ is, in each case, mounted loosely on its bearing, and a piece $q^1$ is provided on each side, the two pieces forming with the roller a cylinder with the axis co-inciding with the imaginary axis of the wheel. Each of the said two pieces is prolonged into a part which, when looked at in plan, is of the shape indicated in the drawing, namely a right prism with a trapezoidal base. By reason of the obliquity of the lateral faces they can slide horizontally in a corresponding slideway in the part $h^1$ of the framework $h$, and at the end of their course come against the corresponding extremity of the slideway.

The inner portion of each of the corresponding parts $h^1$ is provided with cylindrical openings for permitting the said piece $q^1$ to change its position.

As has been previously stated the invention is not limited in any way to the methods of carrying it out or to the particular constructional embodiments which have been described in detail but includes all modifications coming within a fair interpretation of my claims.

In some cases instead of applying my improvements to a tractor, I may apply them to a device of the winch or capstan type, thus obtaining a system or apparatus in which the gripping pulleys would be the relatively fixed portion of the apparatus whilst the device to be gripped would be fed through the said pulley, the necessary constructional modifications being of course provided.

What I claim and desire to secure by Letters Patent of the United States of America is:—

1. A grip device for cable-tractor systems comprising a motor, a plurality of rotary tractive elements driven thereby, for gripping a cable and travelling relative thereto, and means to impart equalized pressure to said cable through said tractive elements through a range of variations in the thickness of said cable.

2. In a grip device for cable-tractor systems, the combination of two pairs of rotary pulleys, one pulley of each pair coming on each side of the cable, the said pulleys being provided with toothed rings, a toothed wheel on each side of the central line of the apparatus gearing with the rings of the two pulleys on its own side, the two wheels moreover meshing with one another and one of them being adapted to be driven from a motor, two arms pivoted on the axis of each wheel, the two arms on each side carrying the before mentioned pulleys and being provided with toothed quadrants, a plate on each of the axles of the said wheels, the plate on each side carrying pinions meshing with one another and with the corresponding toothed sectors, tails to the said pinions directed towards the middle line of the apparatus and controlling means for the said tails for transmitting the haulage strain and regulating the pull substantially as described.

3. In a grip device for cable-tractor systems, the combination of two pairs of rotary pulleys, one pulley of each pair coming on each side of the cable, the said pulleys being provided with toothed rings, a toothed wheel on each side of the central line of the apparatus gearing with the rings of the two pulleys on its own side, the two wheels moreover meshing with one another and one of them being adapted to be driven from a motor, two arms pivoted on the axis of each wheel, the two arms on each side carrying the aforementioned pulleys and being provided with toothed quadrants, a plate on each of the axles of said wheels, the plate on each side carrying pinions meshing with one another and with the corresponding toothed sectors, said pinions being provided with tails, a towing rod, means on said rod for the attachment of a towing line, a pair of spring pressed collars slidably arranged upon said rod, said tails engaging in grooves in said collars.

4. In a grip device for cable-tractor systems, the combination of two pairs of rotary pulleys, one pulley of each pair coming on each side of the cable, the said pulleys being provided with toothed rings, a toothed wheel on each side of the central line of the apparatus gearing with the rings of the two pulleys on its own side, the two wheels moreover meshing with one another and one of them being adapted to be driven from a motor, two arms pivoted on the axis of each wheel, the two arms on each side carrying the before mentioned pulleys and being provided with toothed quadrants, a plate on each of the axles of the said wheels, the plate on each side carrying pinions meshing with one another and with the corresponding toothed sectors, tails to the said pinions directed towards the middle line of the apparatus, controlling means for the said tails for transmitting the haulage strain and regulating the pull substantially as described, and means for stopping and starting the motor operated by the tension of the tractor-cable.

5. In a grip device for cable-tractor systems, the combination of two pairs of rotary pulleys, one pulley of each pair coming on each side of the cable, the said pulleys being provided with toothed rings, a toothed wheel on each side of the central line of the apparatus gearing with the rings of the two pulleys on its own side, the two wheels moreover meshing with one another and one of them being adapted to be driven from a motor, two arms pivoted on the axis of each wheel, the two arms on each side carrying the before mentioned pulleys and being provided with toothed quadrants, a plate on each of the axles of the said wheels, the plate on each side carrying pinions meshing with one another and with the corresponding toothed sectors, tails to the said pinions directed towards the middle line of the apparatus, controlling means for the said tails for transmitting the haulage strain and regulating the pull substantially as described, and clutching means for locking the driving pulleys when the motor stops and freeing them automatically when the motor starts.

6. In a grip device for cable-tractor systems, the combination of two pairs of rotary pulleys, one pulley of each pair coming on each side of the cable, the said pulleys being provided with toothed rings, a toothed wheel on each side of the central line of the apparatus gearing with the rings of the two pulleys on its own side, the two wheels moreover meshing with one another and one of them being adapted to be driven from a motor, two arms pivoted on the axis of each wheel, the two arms on each side carrying the before mentioned pulleys and being provided with toothed quadrants, a plate on each of the axles of the said wheels, the plate on each side carrying pinions meshing with one another and with the corresponding toothed sectors, tails to the said pinions directed towards the middle line of the apparatus, controlling means for the said tails for transmitting the haulage strain and regulating the pull substantially as described, running wheels for suspending said grip device on the cable and means permitting angular movement of said wheels about a vertical axis.

LOUIS JOSEPH JEAN BAPTISTE CHÊNEAU.